United States Patent [19]

Jameson

[11] 4,296,645

[45] Oct. 27, 1981

[54] POWERSHIFT TRANSMISSION WITH DIRECT DRIVE AND MODULATED TORQUE CONVERTER DRIVE IN FORWARD AND REVERSE

[75] Inventor: James J. Jameson, Coffeyville, Kans.

[73] Assignee: Cooper Industries, Inc., Houston, Tex.

[21] Appl. No.: 75,465

[22] Filed: Sep. 14, 1979

[51] Int. Cl.³ ................... F16H 47/08; F16H 57/00
[52] U.S. Cl. ........................ 74/688; 74/404; 74/677; 74/786
[58] Field of Search ............. 192/12 R, 12 C, 18 A, 192/4 C, 54, 13 R, 3.27; 74/404, 785, 786, 787, 788, 718, 730, 687, 688, 677

[56] References Cited

U.S. PATENT DOCUMENTS

| | | | |
|---|---|---|---|
| 2,870,655 | 1/1959 | Rockwell | 74/785 |
| 2,926,551 | 3/1960 | Howard | 74/718 |
| 3,256,751 | 6/1966 | Tuck et al. | 74/718 |
| 3,359,833 | 12/1967 | Flinn | 74/785 |
| 3,396,610 | 8/1968 | Rich et al. | 74/785 X |
| 3,426,622 | 2/1969 | Tuck | 74/718 X |
| 3,728,913 | 4/1973 | Nagasaki | 74/785 |
| 3,916,729 | 11/1975 | Herr | 192/54 X |

*Primary Examiner*—George H. Krizmanich
*Attorney, Agent, or Firm*—Michael E. Martin

[57] ABSTRACT

A three speed powershift gear transmission includes a torque converter mounted on the input shaft and driven by a fluid actuated modulating clutch to provide fine speed control in two output speed ranges, direct drive in a higher speed range and a reversing drive provided by a duplex planetary gear set. A single countershaft mounts the driven gears of the three speed ranges. The first or lowest speed driven gear is mounted on an overrunning clutch and the second driven gear is connectable to the countershaft by a fluid actuated clutch. The direct drive or third gear is fixed to the countershaft and is drivingly engaged to the input shaft through a fluid actuated clutch. The duplex planetary gear includes a friction clutch responsive to axial gear reaction forces to lock the ring gear to the planet gear carrier in forward drive and a fluid actuated brake for arresting rotation of the ring gear to provide reverse rotation of the planet gear carrier and the transmission output shaft.

19 Claims, 3 Drawing Figures

4,296,645

POWERSHIFT TRANSMISSION WITH DIRECT DRIVE AND MODULATED TORQUE CONVERTER DRIVE IN FORWARD AND REVERSE

BACKGROUND OF THE INVENTION

This invention pertains generally to an improved multi-speed gear transmission which includes a modulated input drive to a hydrokinetic torque converter providing for modulation or "inching" control in two speed ranges, and a direct drive to the output shaft, all in forward or reverse direction of rotation of the output shaft.

A substantial variety of vehicle transmissions have been developed to suit the particular operating characteristics of the vehicle itself. In material handling vehicles such as so called lift trucks and front end loaders, a rather specialized type of vehicle operating cycle is encountered which requires a transmission which is capable of operating in various speed ranges. Normally, one or more speeds are desired for picking up and moving loads over a relatively short distance or when traversing a steep grade. Yet another speed ratio of the transmission is desired for moving the vehicle over a longer distance with or without a load. Moreover, it is necessary when picking up or depositing a load to provide for rather precise slow speed movement of the vehicle. It is desirable also to provide for the above mentioned features in both forward and reverse directions of vehicle movement.

SUMMARY OF THE INVENTION

The present invention provides a multispeed power shiftable gear transmission having at least two speed ranges which are obtained through a torque converter driven by a modulating clutch, a direct drive from input to output shaft bypassing the torque converter, and forward and reverse rotation of the output shaft.

The present invention also provides a compact power shift transmission which includes only two rotating shafts which rotate in the same direction regardless of the operating speed range or the direction of rotation of an output shaft which is coaxially aligned with one of the two shafts. Accordingly, the transmission of the present invention may advantageously use multiple disc fluid actuated clutches which in the disengaged condition do not have their interleaved discs subject to vibration or flutter caused by high speed counterrotation.

The present invention further provides a compact duplex planetary gear set to provide for forward and reverse rotation of the output shaft with unidirectional rotation of the input shaft and countershaft. The duplex planetary gear set is operable to automatically reverse the direction of rotation of the output shaft with the engagment or release of one remote controlled fluid actuated clutch and the respective release and engagement of a clutch which is actuated by the thrust forces of the intermeshing gears of the planetary gear set.

The present invention still further provides for a power shift transmission having an auxiliary output shaft comprising an extension of the transmission input shaft and which may be used for driving the transmission fluid charge pump.

The transmission of the present invention may be advantageously used in connection with self-propelled material handling vehicles such as lift trucks and front end loaders. The modulating clutch operating through the torque converter provides for substantially unlimited fine speed control or "inching" capability in two gear reduction ranges. However, those of ordinary skill in the art will recognize other applications which may utilize the superior features of the present invention.

DESCRIPTION OF THE PREFERRED EMBODIMENT

Figure 1:
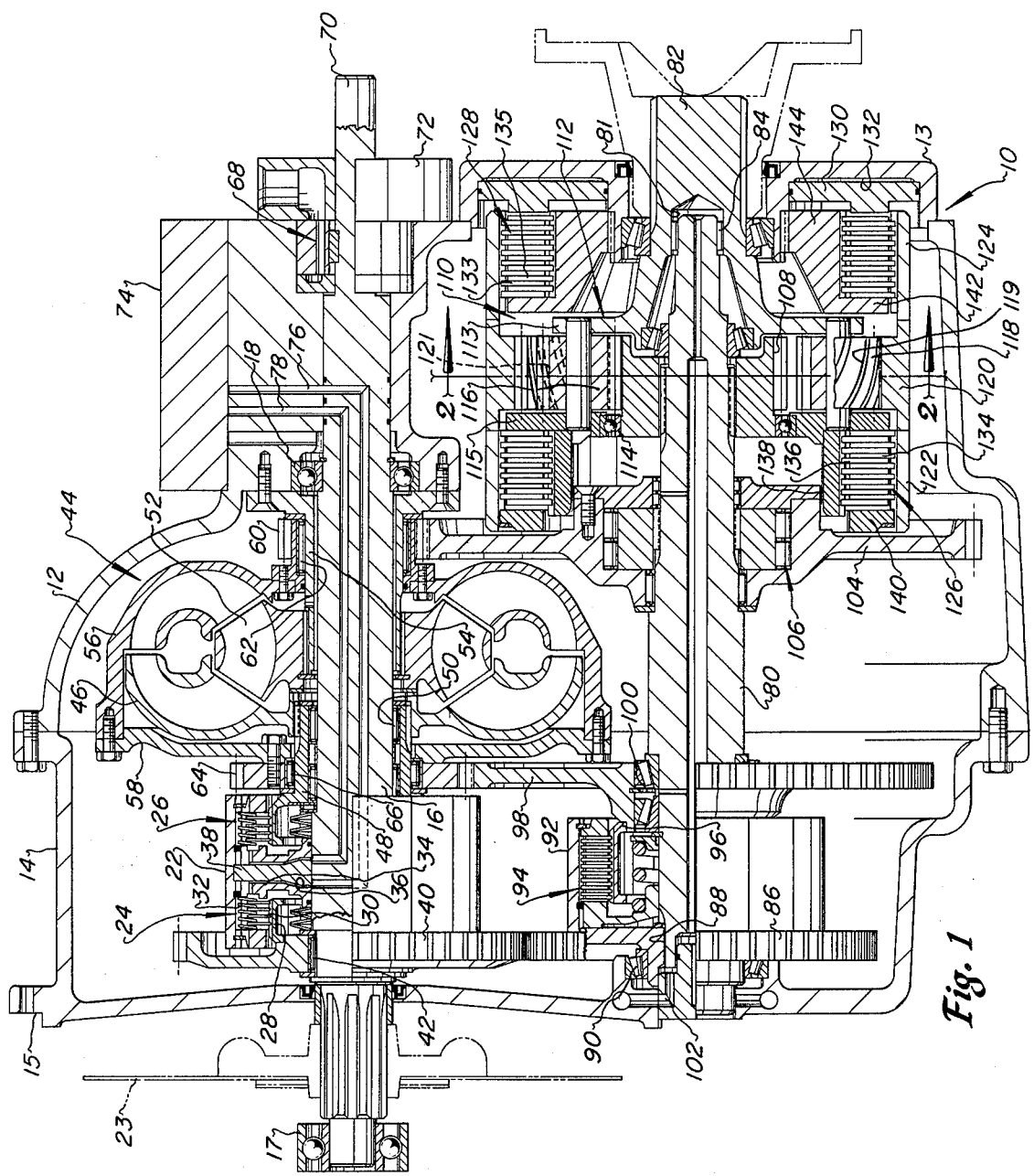
FIG. 1 is a longitudinal central section view of the transmission of the present invention.

Referring to FIG. 1 of the drawings a multispeed power-shiftable transmission is shown and generally designated by the numeral 10. The transmission 10 includes a housing which is divided into two major parts 12 and 14 and a cover part 13 for ease of manufacture and for assembly of the elements disposed in the housing. The transmission 10 also includes an input shaft 16 rotatably journalled in a bearing 18 mounted in the housing part 12. The shaft 16 is also adapted for a standard engine mounting of the transmission 10. Accordingly, the shaft 16 is also supported by a bearing 17 adapted to be disposed in the bore of an engine flywheel or the like, not shown, which would be drivingly coupled to a drive plate 23 mounted on the shaft 16 in a conventional manner by means of suitable interfitting splines. The housing part 14 includes a flange 15 for aligning and bolting the transmission to an engine flywheel housing or the like, also not shown. Other means of mounting the input shaft may be provided if the transmission 10 is not to be coupled directly to a prime mover.

The input shaft 16 includes a double clutch drum 22 fixed to the shaft for rotation therewith. The clutch drum 22 comprises part of two fluid actuated multiple disc clutches, generally designated by the numerals 24 and 26. The clutch 24 is basically formed by the drum 22, a hub 28 and a plurality of interleaved friction discs 30 and 32 which are keyed to the hub and the drum, respectively. The discs 30 and 32 are operable to be pressed into driving engagement by a piston 34 which forms a fluid pressure chamber 36 with the clutch drum web 38. The clutch 24 as well as the clutch 26 is of a type generally well known in the art of power transmissions and further detailed description of the clutch is not believed to be necessary for a clear understanding of the best mode for practicing the present invention. The hub 28 of clutch 24 is fixed to a gear 40 which is rotatably mounted on the input shaft 16 on a suitable bearing 42.

The transmission of the present invention also includes a hydrokinetic torque converter, generally designated by the numeral 44. The torque converter 44 comprises an impeller 46 which is mounted on and drivably connected to a hub 48 comprising the driven member of clutch 26. The hub 48 is rotatably mounted on the shaft 16 on a roller bearing assembly 50. The torque converter 44 also includes a stator element 52 which is fixed to a tubular member 54 which in turn is bolted to the housing 12, as shown in FIG. 1. The torque converter 44 further includes a driven member or turbine 56 which includes a removable cover portion 58 enclosing the impeller 46. The turbine 56 includes an integrally formed hub and gear 60 which is rotatably mounted on a bearing 62 disposed on the member 54. The turbine cover member 58 is also drivably connected to a gear 64 disposed between the clutch 26 and the torque converter 44. The gear 64 is supported on a bearing 66 on the hub 48.

The input shaft 16 extends through the housing part 12 and is drivingly connected to a pump 68 which provides for circulating transmission fluid to the control and lubrication circuits. The shaft 16 also includes a stub end 70 which may be adapted to drive additional auxiliary devices. The pump 68 is conveniently disposed in the housing part 12 in a way that provides for easy removal and replacement by removing a pump cover member 72. A control valve unit 74 is also disposed on the housing part 12 and is operable to supply pressure fluid through passages 76 and 78 in the shaft 16 to the clutches 24 and 26, respectively.

The transmission 10 is further characterized by a countershaft 80 rotatably disposed in the transmission housing. One end of the countershaft 80 extends into a recess 81 in an output shaft 82 and is rotatably mounted on a bearing 84 disposed in the recess. The opposite end of the countershaft 80 is connected to a gear 86 by means of cooperating interfitting splines 88. The gear 86 is rotatably mounted in the housing on a bearing assembly 90. The gear 86 is in constant mesh with the gear 40 on the input shaft 16. The gear 86 also is fixed to the clutch drum 92 of a fluid actuated multiple disc friction clutch 94 generally of the same type as the clutches 24 and 26. The clutch 94 includes a hub 96 comprising the clutch driving member and which is fixed to a gear 98. The gear 98 is rotatably mounted on a bearing 100 and is in constant mesh with the gear 64. Accordingly, when the clutch 94 is engaged the countershaft 80 is rotatably driven by the torque converter 44 through gears 64 and 98 provided that the clutch 26 is drivingly connected to the torque converter. Pressure fluid is supplied to the clutch 94 by way of a passage 102 and clearance between the interfitting splines 88.

The transmission 10 is still further characterized by a gear 104 which is in constant mesh with the gear 60 and is mounted on a suitable one-way or overrunning clutch assembly 106 mounted on the countershaft 80. The one-way clutch 106 provides for driving the countershaft 80 by the torque converter 44 through the gears 60 and 104 as long as the clutch 94 is not engaged. However, since the gears 64 and 98 provide for a higher rotative speed of the countershaft than the gears 60 and 104, for a given speed of the torque converter turbine 56, the countershaft may overrun the gear 104 when the clutch 94 is engaged as provided for by the one-way clutch 106. A detailed description of the clutch 106 is not believed to be necessary to a clear understanding of the present invention. The clutch 106 may be one of the roller or sprag types which are commercially available. Moreover, the clutch 106 could be replaced by a fluid actuated clutch similar to the clutch 94 although the clutch 106 is a somewhat simpler arrangement in the illustrated embdiment.

Figure 2:
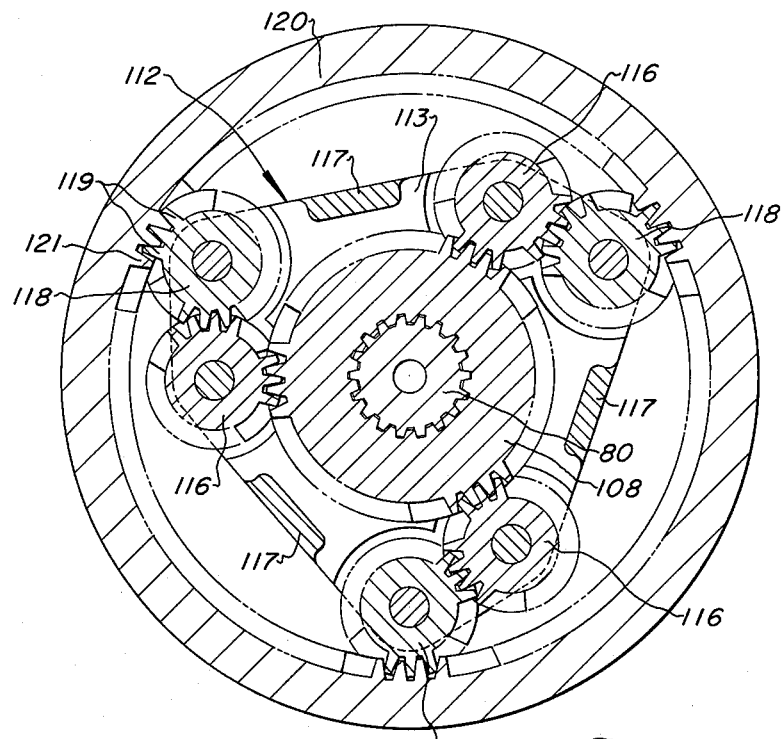
FIG. 2 is a transverse section taken along the line 2—2 of FIG. 1.

The transmission 10 advantageously includes a superior mechanism for reversing the direction of rotation of the output shaft 82 while the shafts 16 and 80 are rotated in one direction of rotation at all times. Referring to FIGS. 1 and 2, the countershaft 80 is drivingly engaged with a sun gear 108 of a duplex planetary gear set, generally designated by the numeral 110. The planetary gear set 110 also includes a planet gear carrier 112 which is integrally formed as part of the output shaft 82 and is partly supported by a bearing 114 mounted on the sun gear 108. The carrier 112 is characterized by spaced apart platelike portions 113 and 115 which are fixed to each other by a plurality of interconnecting webs 117. The carrier 112 rotatably supports a plurality of planet gears 116 which are each respectively meshed with the sun gear 108 and with a second planet gear 118. The planet gears 118, which are also rotatably supported by the carrier 112, are each meshed with a ring gear 120. The ring gear 120 includes oppositely projecting drum portions 122 and 124 which are, respectively, part of a clutch 126 and a brake 128.

The brake 128 is of the fluid actuated multiple disc type and includes a piston 130 responsive to pressure fluid introduced into a chamber 132 to press a plurality of interleaved friction discs 133 and 135 into engagement to cause the brake to arrest rotation of the ring gear with respect to the housing part 12. Pressure fluid is supplied to the chamber 132 from the transmission controls through suitable passage means, not shown. The clutch 126 includes multiple interleaved discs 134 and 136 alternate ones of which are fixed, respectively, to the drum 122 and an axially extending hub portion 138 of the planet carrier 112. The discs 134 and 136 are operable to be forcibly engaged by an annular plate 140 fixed to the drum 122. In response to axial movement of the ring gear 120 to the right, viewing FIG. 1, the clutch 126 is operable to become forcibly engaged to lock the ring gear and the planet gear carrier 112 together for rotation as a unit. In this condition the output shaft 82 is rotated at the speed of the countershaft 80 and in the same direction as the countershaft.

Axial movement of the ring gear 120 to effect engagement of the clutch 126 is caused by axial thrust forces generated by the interacting helical gear teeth 119 and 121 on the planet gears 118 and the ring gear 120, respectively. Accordingly, when the brake 128 is not engaged the reaction thrust forces exerted by the gears 118 and 120 are normally sufficient to engage the clutch 126. The clutch 126 could, of course, be adapted to be fluid actuated or a fluid actuated clutch could be provided for interconnecting the sun gear 108 and the ring gear 120. However, the clutch 126 is a simpler and more reliable arrangement for effecting rotation of the output shaft 82 at the speed of and direction of rotation of the countershaft 80.

Figure 3:
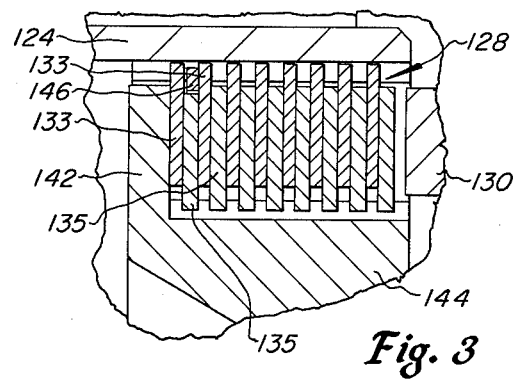
FIG. 3 is a fragmentary section view of a portion of the reversing mechanism brake shown in FIG. 1.

Referring to FIG. 3, also, when the piston 130 is actuated to engage the brake 128 the interleaved discs 133 and 135 are moved axially to the left, viewing FIG. 3, and are clamped between the piston 130 and an annular plate 142 which is formed as an integral part of a hub 144 fixed to the housing part 12. When the discs 133 and 135 are moved as above described, a shoulder formed by a retaining ring 146 disposed on the drum 124 is engaged by one of the discs 133 and moves the ring gear 120 to the left also, viewing FIG. 3, to cause disengagement of the clutch 126. Moreover, the transmission controls normally provide for release of the driving clutches before engagement of the brake 128 is effected thereby reducing the axial thrust reaction forces on the ring gear 120 which would be opposite to the clamping force of the piston 130. When the ring gear 120 is nonrotatably braked by actuation of the brake 128 the output shaft 82 is rotated in the opposite direction due to the duplex planet gears 116 and 118. The rotational speed of the output shaft 82 when the brake 128 is actuated is reduced with respect to the countershaft by the speed ratio of the planetary gear set which results from the sun gear 108 driving and the ring gear 120 being stationary.

The transmission may be operated in one of the so-called working speed ranges by engagement of the clutch 26. With only the clutch 26 engaged, the countershaft 80 is driven in the first working speed range by way of the torque converter 44, and the gears 60 and 104, and the output shaft 82 is driven in forward or reverse depending on whether or not the brake 128 is actuated. The fluid pressure applied to the clutch 26 may be varied to slip the clutch to vary the input power and speed to the torque converter impeller 46. Accordingly, depending on the degree of engagement of the clutch 26 the torque and speed of the output shaft 82 may be finely controlled to improve handling of the vehicle.

A second and higher speed range of the countershaft may be obtained by engagement of the clutch 94 together with the modulating clutch 26. Even though in this operating condition the gear 104 is driven by the gear 60 the speed of gear 98 with respect to gear 104 is greater and the countershaft 80 will rotate faster than the gear 104 and, of course, is able to do so due to the overrunning clutch 106.

Direct drive from the input shaft 16 to the countershaft 80 may be obtained by engagement of only the clutch 24 whereby the gear 40 drives the gear 86. The speed of the countershaft 80 with respect to the input shaft 16 is highest in the condition described immediately above due to the relative sizes of the gears 40 and 86 and the fact that the torque converter 44 is bypassed. Accordingly, this driving condition would normally be used for high speed vehicle travel for example.

It may be appreciated from the foregoing that a transmission has been provided which is operable in three speed ranges in forward and reverse together with fine-speed control in two speed ranges and wherein a minimum number of clutches and shafts are required. Moreover, when any one of the fluid actuated clutches is disengaged, speeds of relative rotation between the interleaved clutch discs are minimized and counter-rotating clutch discs are avoided.

What is claimed is:
1. A multispeed gear transmission comprising:
a housing;
an input shaft rotatably mounted in said housing;
a hydrokinetic torque converter disposed in said housing including an impeller and a turbine;
first and second gears drivenly connected to said turbine;
a countershaft rotatably mounted in said housing and disposed in generally parallel relation to said input shaft;
third and fourth gears mounted on said countershaft and intermeshed respectively with said first and second gears;
clutch means drivingly interconnecting said third gear to said countershaft;
a first fluid actuated clutch drivingly connecting said input shaft to said impeller;
an output shaft; and,
a reversing mechanism interconnecting said countershaft and said output shaft for reversing the direction of rotation of said output shaft with respect to said countershaft.
2. The invention set forth in claim 1 wherein:
said transmission includes a second fluid actuated clutch for drivingly connecting said fourth gear to said countershaft.
3. The invention set forth in claim 2 wherein:
said transmission includes a fifth gear rotatably mounted on said input shaft, a sixth gear meshed with said fifth gear and drivingly connected to said countershaft and clutch means for releasably connecting said input shaft to said fifth gear.
4. The invention set forth in claims 1 or 3 wherein:
said output shaft is coaxially aligned with said countershaft.
5. The invention set forth in claim 4 wherein:
said reversing mechanism comprises a duplex planetary gear set having a sun gear drivably connected to said countershaft, a planet gear carrier drivably connected to said output shaft and a ring gear including first means for releasably connecting said ring gear to said planet carrier for rotating said output shaft in a forward direction and second means for releasably braking said ring gear to provide for rotation of said output shaft in a reverse direction.
6. The invenion set forth in claim 5 wherein:
said first means comprises a clutch responsive to axial movement of said ring gear to cause said ring gear and said planet carrier to be connected for rotation together at the speed of said countershaft.
7. The invention set forth in claim 6 wherein:
said planetary gear set includes at least one planet gear having helical teeth thereon and meshed with corresponding helical teeth on said ring gear, and said clutch is repsonsive to the axial movement of said ring gear caused by axial thrust forces exerted by said intermeshing, helical gear teeth to connect said ring gear to said planet carrier for rotation therewith.
8. The invention set forth in claim 5 wherein:
said braking means comprises a fluid actuated multiple disc brake.
9. The invention set forth in claim 8 wherein:
said brake includes a piston disposed in a chamber formed in a transverse end wall of said housing.
10. The invention set forth in claim 7 wherein:
said clutch includes multiple interleaved discs fixed for rotation with said ring gear and said planet gear carrier, respectively.
11. The invention set forth in claim 8 wherein:
said clutch and said brake are arranged axially on opposite sides of said ring gear.
12. The invention set forth in claim 3 wherein:
said second fluid actuated clutch includes a driven member fixed to said sixth gear.
13. The invention set forth in claim 3 wherein:
said input shaft extends through a transverse end wall of said housing and includes a portion drivingly connected to a pump mounted in said end wall.
14. In a power transmission including a housing, an input shaft and an output shaft, a reversing mechanism for changing the direction of rotation of said output shaft with respect to said input shaft, said reversing mechanism comprising:
a duplex planetary gear set including a sun gear drivably connected to said input shaft, a planet gear carrier drivably connected to said output shaft, and planet gear means rotatably mounted on said planet gear carrier and meshed with a ring gear of said planetary gear set, said ring gear being mounted in said housing for rotation with respect to said housing and for axial movement with respect to said housing in response to axial driving forces exerted on said ring gear by said planet gear means;

clutch means adapted to releasably engage with said ring gear in response to axial movement of said ring gear due to driving forces exerted on said ring gear by said planet gear means whereby said output shaft is driven in one direction of rotation with respect to said input shaft; and braking means associated with said ring gear and operable to release said clutch means and engage said ring gear whereby said output shaft is driven in another direction of rotation with respect to said input shaft.

15. The invention set forth in claim 14 wherein:
said planetary gear set includes at least one planet gear having helical teeth thereon and meshed with corresponding helical teeth on said ring gear, and said clutch is responsive to the axial movement of said ring gear caused by axial thrust forces exerted by said intermeshing, helical gear teeth to connect said ring gear to said planet carrier for rotation therewith.

16. The invention set forth in claim 14 wherein:
said braking means comprises a fluid actuated multiple disc brake.

17. The invention set forth in claim 16 wherein:
said brake includes a piston disposed in a chamber formed in a transverse end wall of said housing.

18. The invention set forth in claim 15 wherein:
said clutch includes multiple interleaved discs fixed for rotation with said ring gear and said planet gear carrier, respectively.

19. The invention set forth in claim 16 wherein:
said clutch and said brake are arranged axially on opposite sides of said ring gear.

* * * * *